UNITED STATES PATENT OFFICE.

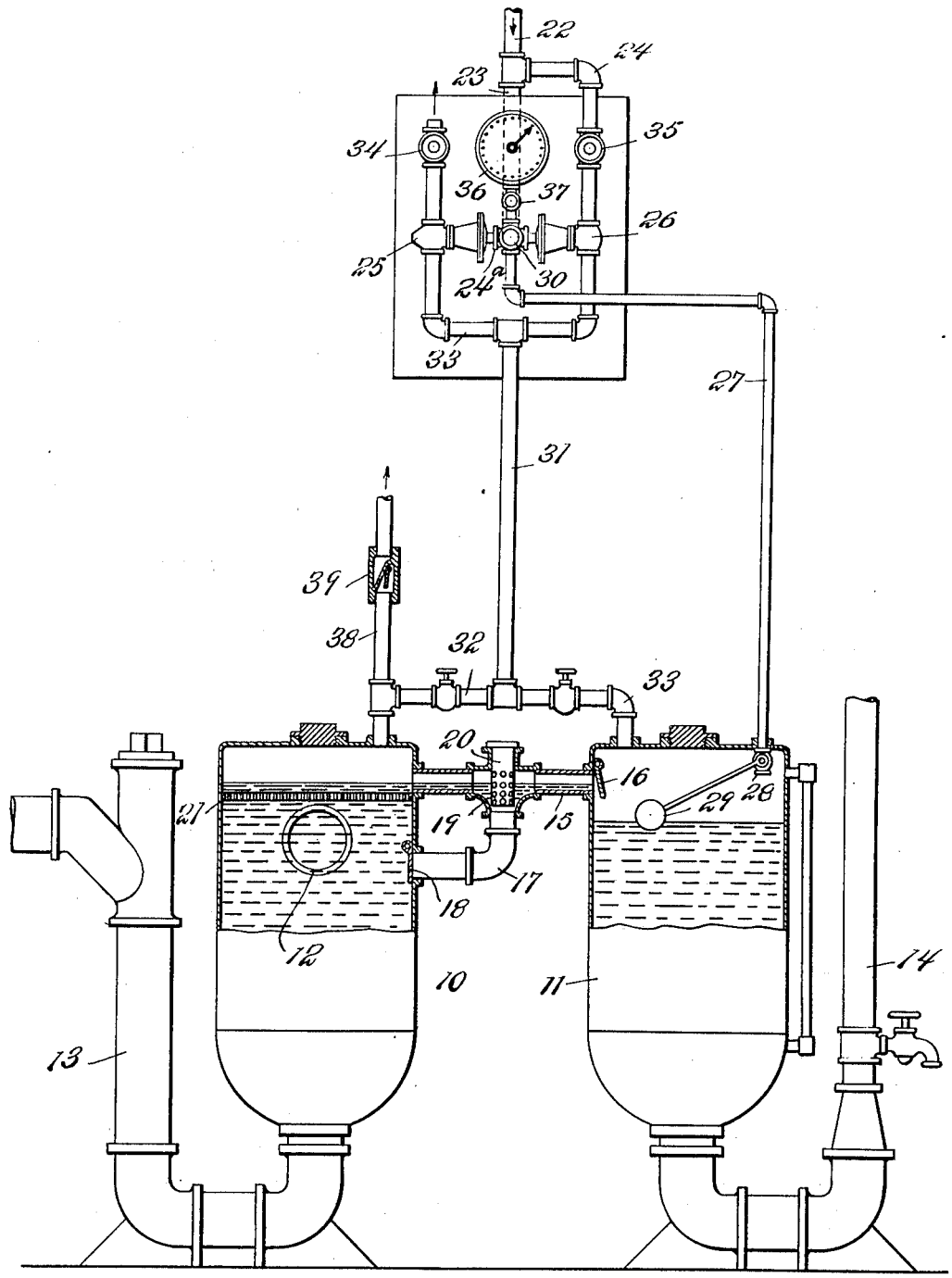

GEORGE V. ELLIS, OF NEW YORK, N. Y.

APPARATUS FOR DISPOSING OF OIL-LADEN DRAINAGE.

1,041,050.  Specification of Letters Patent.  Patented Oct. 15, 1912.

Application filed February 23, 1912. Serial No. 679,527.

*To all whom it may concern:*

Be it known that I, GEORGE V. ELLIS, a citizen of the United States, and a resident of the borough of Bronx, city, county, and State of New York, have invented certain new and useful Improvements in Apparatus for Disposing of Oil-Laden Drainage, of which the following is a full, clear, and exact description.

My invention relates to certain improvements in apparatus for the separation of oils or other liquids which may separate from sewage, and for separately disposing of the oils and the remaining portion of the sewage.

Although my invention may be employed in connection with the sewage system of any building, or might even be used for separating oils from liquids, not necessarily sewage, yet the main use for which my invention is designed is in garages or other buildings where automobiles are stored and cleaned, as the waste from such buildings usually contains a large percentage of gasolene, lubricating oils and the like. By the use of my improved apparatus these oils, and particularly the gasolene is prevented from flowing into the sewer and the danger of explosion of gasolene vapor in the sewer is avoided. In my improved construction the sewage flows through a chamber or tank, constituting the separating tank and from which the gasolene lubricating oils or other lighter liquids all of which, will be hereinafter referred to as oils, may flow off to an oil collecting tank. When this last mentioned tank is filled the mechanism is automatically set in motion for forcing the contents out of the tank and delivering it to any desired receiving point.

My invention involves certain special features of construction and combinations of parts which will be fully set forth hereinafter and particularly pointed out in the claims.

Reference is to be had to the accompanying drawing, forming a part of this specification, and illustrating a side elevation of an apparatus constructed in accordance with my invention, portions of the tanks and connections being broken away to show the interior construction.

In the specific form illustrated I employ two tanks or chambers 10 and 11; the former constituting the separating tank and the latter constituting the oil collecting tank. The sewage enters the tank 10 through a supply conduit 12, which is provided with a check valve (not shown) to prevent the return flow of the sewage. The inlet 12 enters intermediate of the top and bottom of the tank and below the normal liquid level of the tank. The outlet of the conduit 13 is connected to the bottom of the tank, and out through which the main body of the sewage and the sediment may flow. Outlet conduit 13 includes an elbow rising outside of the tank, so as to maintain the liquid level in the tank at approximately the point indicated. The tank is preferably conical or inclined at the bottom so that all of the sediment will settle to the outlet of the conduit.

The oil collecting tank 11 is similar in construction to the separating tank 10, and has an outlet conduit 14 connected to its lowermost point and rising to any elevation to which it is desired to deliver separated oils. The two tanks are connected together by a conduit 15 disposed substantially, horizontally and at approximately the normal liquid level in the tank 10. The conduit 15 has a check valve 16 to prevent the return flow of oil from the tank 11 to the tank 10 and intermediate the ends of the conduit 15, I connect a return conduit 17 leading back to the tank 10 below the liquid level in the latter. The return conduit 17 has a check valve 18 to prevent the entrance of liquid thereto from the tank 10, and at the point where the conduit 17 joins the conduit 15 there is a coupling 19 of such form that any sediment or heavier liquid will settle into the conduit 17 and return to the tank 10. Opposite the inlet end, conduit 17, the coupling carries a screen 20 which aids in separating any sediment from the liquid and preventing it from flowing into the tank 11. Furthermore, it acts as a baffle to collect particles of water carried along with the oil and to direct them down into the conduit 17. The end of the screen is spaced a slight distance from the lower side of the coupling so that the sediment engaged with the outer surface of the screen may fall down into the conduit 17. For preventing the solid matter in the sewage and the main body of the sediment from reaching the conduit 15 I provide a horizontal screen 21 in the tank 10 above the inlet 12 and below the oil outlet 15. Whatever solid matter tends to float to the top in the tank 10 will be caught by this screen. When the tank is emptied as will be more particularly pointed out hereinafter, the screen is automatically cleaned by the water level being lowered to a point below the screen.

My improved means for emptying either one or both of the tanks, includes a source of compressed air and of the supply and means for automatically controlling the delivery of the compressed air. The air under the desired pressure is delivered to a panel board through a conduit 22 and at the board there are two branches 23 and 24. The branch 23 leads to a coupling 24ª and the diaphragms of two automatic valves 25 and 26. From the coupling a conduit 27 extends to the oil tank 11 and within the oil tank is a valve 28, and any suitable means for normally holding this valve shut, but opening it when the oil in the tank to a predetermined level. In the specific form illustrated I employ a reverse acting ball cock and float 29. This valve is normally closed and at the coupling 24ª there is a manually operated valve 30, which is normally open. The compressed air line thus reaches to the valve 28 and acts on the diaphragms of the two valves 25 and 26. The valve 26 is in the conduit 24ª and the action of the compressed air is to hold the valve closed. Beyond this valve the conduit has a branch 31 which extends to the vicinity of the tanks and connects to two branch conduits 32 and 33 leading to the interior of the two tanks. In each branch there is a manually controlled valve whereby either branch may be closed independently of the other. The valve 25 is in a branch conduit 33 leading from the branch 31 and beyond the valve 25 the said branch terminates in a vent, the size of which may be controlled by a regulating valve 34. The compressed air may be shut off from flowing to the valve 26 by a manually operated valve 35 and the pressure in the line may be indicated by a gage 36 connected to the coupling 24ª and having a shut-off cock 37. The tank 10 has a vent pipe 38 normally open and permitting the escape of gases from the tank. In this pipe there is a reverse acting check valve 39 which will close upon the delivery of compressed air to the tank 10 so as to prevent the escape of the compressed air and automatically open upon the relieving of the pressure.

The operation of my improved apparatus is substantially as follows: The compressed air is normally prevented from escaping by the closed valves 26 and 28. When the oil rises in the tank 11 to such a level that the float opens the valve 28, the compressed air in the pipe 27 can escape, and the pressure against the two diaphragms will be relieved. The valve 26 will then open and the valve 25 will close by the action of the springs associated with the diaphragms. I have not illustrated these valves operating mechanisms in detail as they may be of any well known form. As soon as the valve 26 is opened the air will flow through the pipe 31 to both of the tanks 10 and 11 and the oil will be forced out through the pipe 14 and the sewage will be forced out through the pipe 13. The liquid in dropping away through the screen 21 will permit the solid bodies or particles which may have collected on the under-side to drop away, and thus the screen will be automatically cleaned. As soon as the oil level drops a predetermined distance the valve 28 will close, and the pressure in the pipe 27 will increase and the diaphragms will be acted upon to close the valve 26 and open the valve 25. The air in the two tanks will be under pressure as the reverse check valve closed as soon as the compressed air started to rush up the vent pipe 38. No more compressed air will enter the two tanks after the valve 26 closes, but the air which is already in the tanks will expand and the ejecting action will continue until both tanks are approximately empty. The time during which the air will continue to expand and force out the oil and sewage is regulated by the valve 34. This valve is adjusted to such a position that the air can escape therethrough only very slowly. When the pressure in the two tanks has decreased to atmospheric pressure the check valve 39 will open and the parts will again be in normal position ready for the admission of more sewage. As soon as the tank 10 fills with oil and sewage the oil will begin passing over to the tank 11 and accumulate therein until the valve 28 is again opened and the operation above described repeated.

Various changes may be made in the construction and operation of my improved apparatus within the scope of the appended claims without departing from the spirit of my invention, as it is evident that the mechanism might be varied and still secure substantially the same results.

It will be observed that the discharge pipe 13 standing alongside of the tank or reservoir 10 maintains the drainage or sewage in said tank at a predetermined level, i. e. the level of the outlet from the pipe 13, and it will also be perceived that the oil outlet pipe 15 being above the level of the outlet pipe 13, will cause a body of oil to be maintained in the tank 12 on top of the sewage or drainage. In this body of oil a screen 21 is located, and in the normal operation of the machine the screen is submerged horizontally in said oil body. This keeps the screen moist and prevents particles of waste from the oil, and other foreign matter, from drying on or adhering to the screen, thus clogging it, and further, when air pressure is applied to the top of the tank 10 to discharge the contents thereof, the action is to dislodge these particles of foreign matter from the bottom of the screen, thus cleansing the screen and keeping it free for the discharge of the oil through it. It will further be observed that the location of the outlet in the tapering bottom of the tank 10 allows for blowing out or draining the tank each time that the air pressure is applied. As the sewage or drainage rushes into the tank 10 through the inlet 12, the particles of oil are thrown for the moment downward and in every direction through the body of water below the screen 21, but they instantly rise through the water and pass into the said oil body above the same, from which they gradually flow out through the pipe 15. This oil body is maintained above the sewage inlet, so that the separation is facilitated by the natural tendency of the oil and water, namely, the water to descend from the inlet 12 and the oil to rise from the same. This relative location of the parts is very important in dealing with the separation of drainage from such establishments as motor garages, where bodies of water laden with all manner of impurities are received in the separator. In addition to the oils there is a heavy percentage of sand and "muck," and the location of the inlet below the oil body of the screen avoids any contact between the screen and these heavy particles of foreign matter. The screen has only to dispose of the buoyant foreign matter such as match sticks, cotton waste, paper and the like, and this is amply provided for by the location of the screen in the oil body substantially horizontally, and the arrangement of the air supply so that it blows downward, clearing such matter away from the body of the screen on each air application.

Having thus described my invention, what I claim is new and desire to secure by Letters Patent of the United States is:—

1. An apparatus for disposing of oil-laden drainage, comprising a reservoir with an inlet intermediate its vertical length and an outlet at its lower portion below the inlet, means for maintaining the drainage in the reservoir at a fixed level, an oil outlet means from the reservoir above said level and above the inlet whereby a body of oil is maintained in the reservoir over the drainage level and above the inlet, and a separator device located in the reservoir in the said body of oil and between the reservoir inlet and the oil outlet means.

2. An apparatus for disposing of oil-laden drainage, comprising a reservoir, with an inlet intermediate its vertical length and an outlet at its lower portion below the inlet, means for maintaining the drainage in the reservoir at a fixed level, an oil outlet means from the reservoir above said level and above the inlet whereby a body of oil is maintained in the reservoir over the drainage level and above the inlet, and a separator device located in the reservoir in the said body of oil and between the reservoir inlet and the oil outlet means, said separator device comprising a screen disposed substantially horizontally across the reservoir in said body of oil.

3. An apparatus for disposing of oil-laden drainage, comprising a reservoir with an outlet intermediate its vertical length and an outlet at its lower portion below the inlet, means for maintaining the drainage in the reservoir at a fixed level, an oil outlet means from the reservoir above said level and above the inlet whereby a body of oil is maintained in the reservoir over the drainage level and above the inlet, and a separator device located in the reservoir in the said body of oil and between the reservoir inlet and the oil outlet means, and a branch or return pipe leading back from the oil outlet means to the reservoir below the level of the said body of oil to return to the reservoir sudden overflows from the same.

4. An apparatus for disposing of oil-laden drainage, comprising a reservoir with an inlet intermediate its vertical length and an outlet at its lower portion below the inlet, means for maintaining the drainage in the reservoir at a fixed level, an oil outlet means from the reservoir above said level and above the inlet whereby a body of oil is maintained in the reservoir over the drainage level and above the inlet, and a separator device located in the reservoir in the said body of oil and between the reservoir inlet and the oil outlet means, and means for supplying air pressure to the top of the tank or reservoir above the said separator device for the purpose specified.

In testimony whereof I have signed my name to this specification in the presence of two subscribing witnesses.

GEORGE V. ELLIS.

Witnesses:
JOSEPH L. BURKE,
CLAIR W. FAIRBANK.